W. AND J. C. ERDWINS.
RESILIENT WHEEL.
APPLICATION FILED JAN. 21, 1922.
1,419,242.
Patented June 13, 1922.
2 SHEETS—SHEET 1.
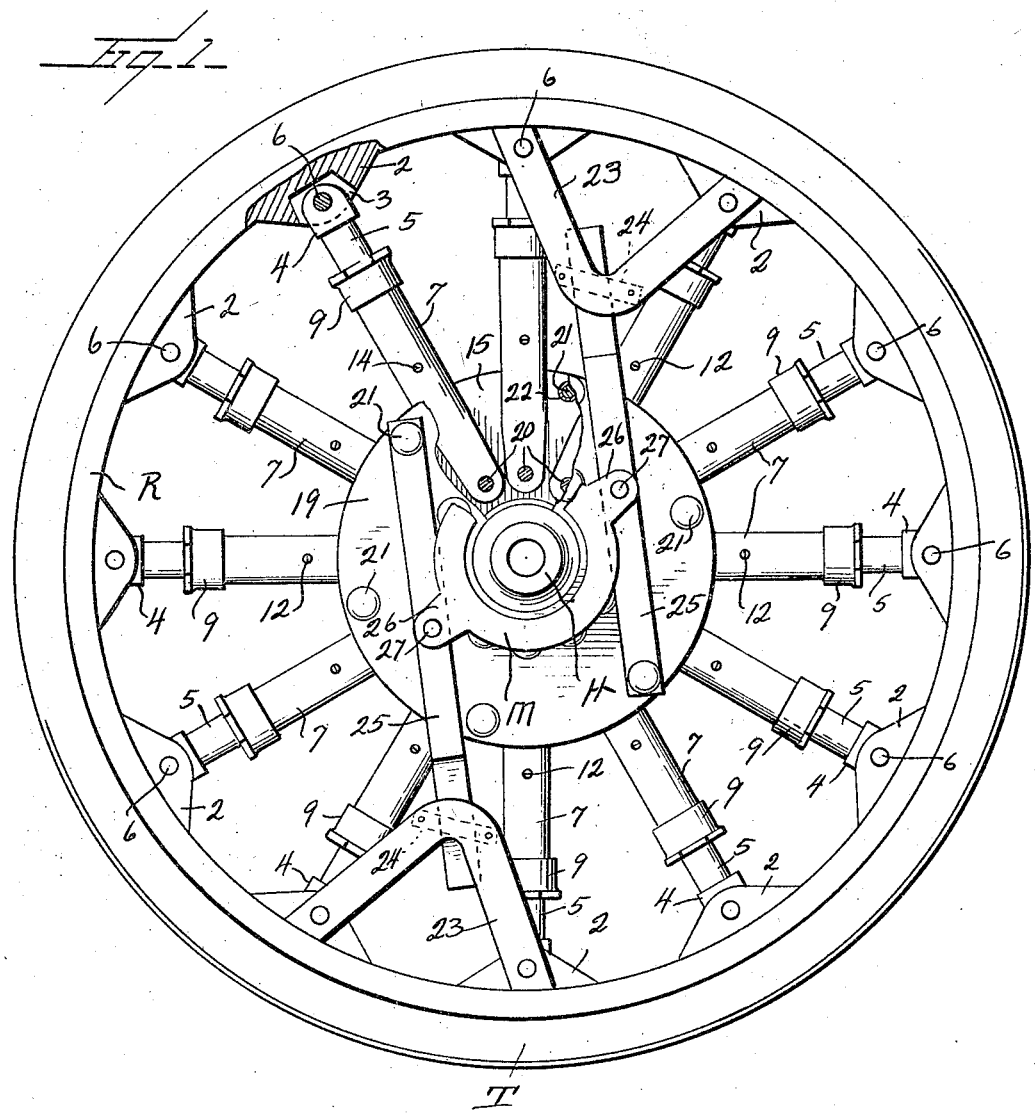
Inventors
W. Erdwins and
J. C. Erdwins
By Watson E. Coleman
Attorney

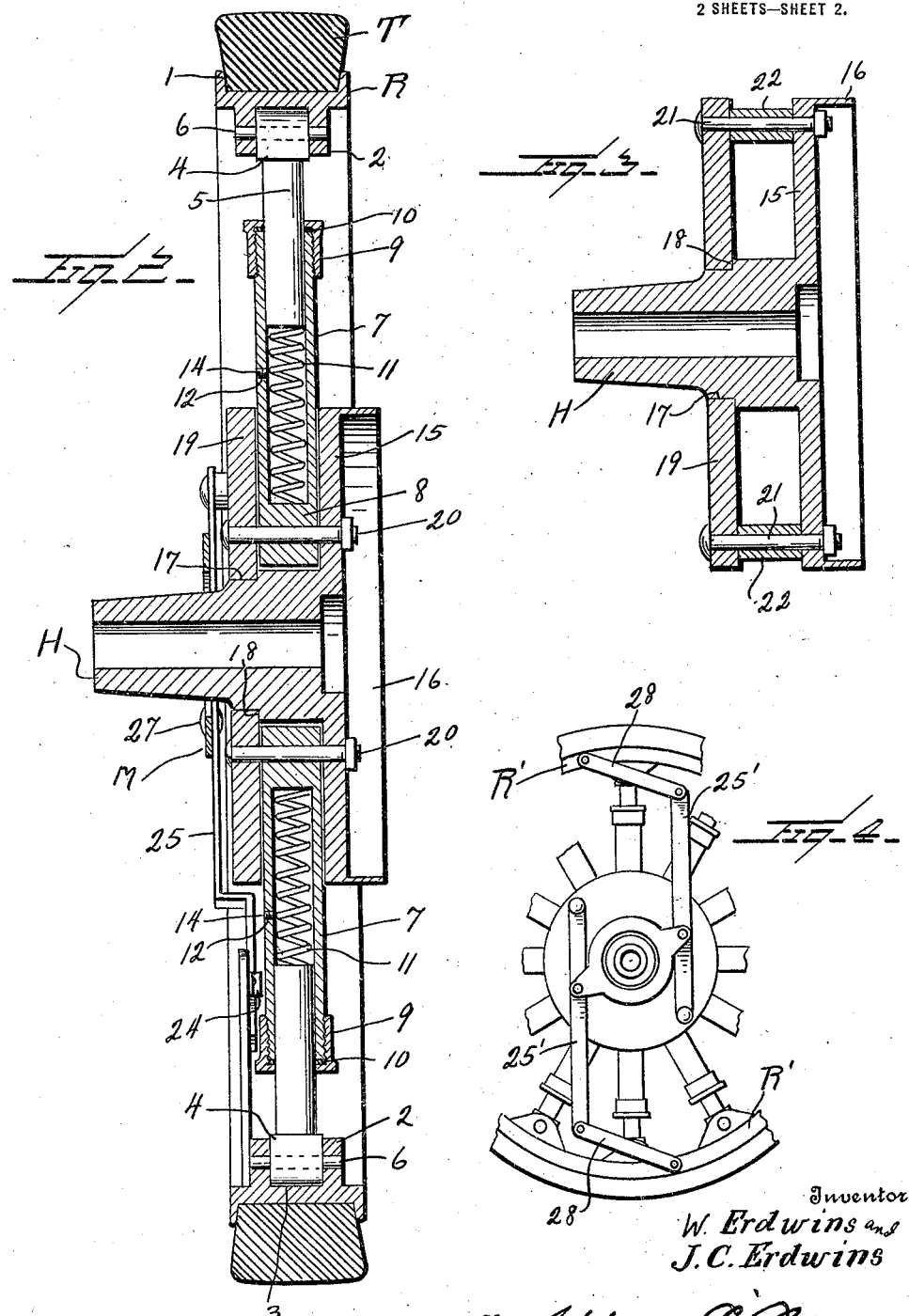

UNITED STATES PATENT OFFICE.

WILLIAM ERDWINS AND JOHN C. ERDWINS, OF HARRISONVILLE, MISSOURI.

RESILIENT WHEEL.

1,419,242.  Specification of Letters Patent.  Patented June 13, 1922.

Application filed January 21, 1922. Serial No. 530,858.

*To all whom it may concern:*

Be it known that we, WILLIAM ERDWINS and JOHN C. ERDWINS, citizens of the United States, residing at Harrisonville, in the county of Cass and State of Missouri, have invented certain new and useful Improvements in Resilient Wheels, of which the following is a specification, reference being had to the accompanying drawings.

This invention relates to certain improvements in resilient wheels, and it is an object of the invention to provide a novel and improved device of this general character which possesses such flexibility as to compensate for the shocks and jars incident to travel.

It is also an object of the invention to provide a novel and improved device of this general character wherein the use of air is eliminated and whereby are eliminated the annoyances and discomforts resulting from punctures, defective valves, inner tubes, patches and the like.

An additional object of the invention is to provide a novel and improved wheel which, when applied to a vehicle, effectively serves as a shock absorber for the car and more especially the axles and gears of a motor driven vehicle, although our invention is particularly adapted for use in connection with passenger automobiles and trucks.

It is a more specific object of the invention to provide a novel and improved wheel comprising a hub and a rim with a cushioning agency or medium interposed therebetween, together with an equalizing structure coacting with the hub and rim to maintain the wheel in its entirety in true balanced relation and at the same time to permit relative movement of the hub and rim whereby the cushioning agency or medium becomes effective.

The invention consists in the details of construction and in the combination and arrangement of the several parts of our improved resilient wheel whereby certain important advantages are attained and the device rendered simpler, less expensive and otherwise more convenient and advantageous for use, as will be hereinafter more fully set forth.

The novel features of our invention will hereinafter be definitely claimed.

In order that our invention may be the better understood, we will now proceed to describe the same with reference to the accompanying drawings, wherein:

Figure 1 is a view in side elevation, with portions broken away, of a resilient wheel constructed in accordance with an embodiment of our invention;

Figure 2 is an enlarged sectional view taken radially through the structure illustrated in Figure 1;

Figure 3 is a sectional view taken through the hub structure detached; and

Figure 4 is a fragmentary view in side elevation illustrating a wheel constructed in accordance with a further embodiment of our invention.

As disclosed in the accompanying drawings, R denotes a rim or felly provided in its periphery with a circumferentially disposed continuous channel 1 in which is engaged the tire T, said tire being of a solid type. At intermittently spaced points the rim R is provided with the inwardly directed lugs 2. As herein disclosed, each of the lugs 2 is substantially in the form of a V with its apex inwardly disposed and having its apex portion provided with a pocket or recess 3 in which is seated the head or enlarged portion 4 of a spoke section 5. The head or enlargment 4 is pivotally held in applied position by the pin 6, said pin intersecting the pocket or recess 3 and freely extending through the head or enlargment 4.

The opposite or inner end portion of the spoke section 5 telescopically engages within an inner tubular spoke section 7. The outer end of the section 7 is open while the inner or opposite end portion is closed, as at 8, to provide means whereby the inner spoke section 7 may be held in applied or working position. The spoke section 5 fits snugly within its coacting tubular spoke section 7.

Threaded upon the outer end portion of the tubular spoke section 7 is a cap 9 which serves to hold in proper contact with the spoke section 5 a gasket 10. The gasket 10 surrounds the spoke section 5 and operates to prevent the escape of grease or kindred lubricant which is applied within the tubular section 7 so that the sections 5 and 7 of a spoke may have relative movement with a minimum of frictional resistance.

Interposed between the closed end 8 of the tubular spoke section 7 and the inner or inserted end of the outer spoke section 5 is an expansible member 11, herein disclosed as a coiled spring, said member or spring 11 possessing the requisite yielding resistance. The tubular spoke section 7 is provided in its wall with an opening 12 normally closed by a plug 14. The opening 12 provides means whereby the desired lubricant may be applied within the tubular spoke section 7.

H denotes a hub of desired configuration and dimensions and which has its inner end portion defined by an outstanding annular flange 15, said flange being herein disclosed as having its periphery provided with an inwardly directed annular flange 16 to provide a brake drum.

The periphery of the hub H at a desired distance outwardly of the flange 15 is provided with an annular rabbet 17 providing an annular shoulder 18. A removable flange 19 surrounds the hub H and seats within the rabbet 17. The inner portions of the spoke sections 7 extend between the flanges 15 and 19 to points in close proximity to the hub H and each of said spoke sections 7 has its inner end portion pivotally supported by a bolt 20 or the like disposed through the flanges 15 and 19 and the closed end portion 8 of the spoke section 7.

The peripheral portions of the flanges 15 and 19 at points equi-distantly spaced circumferentially thereof are connected by the bolts 21 or the like, each of said bolts extending between a pair of adjacent spoke sections 7. Each of the bolts 21 between the flanges 15 and 19 is surrounded by a spacing sleeve 22.

At substantially diametrically opposed points, the rim R has extending inwardly therefrom the substantially V-shaped members 23, the extremities of each of said members being secured to a pair of adjacent lugs 2. The apex portion of each of the members 23 has secured to the inner face thereof a strap 24 providing a loop through which an end portion of an elongated arm or bar 25 is freely disposed. The arms or bars 25 are two in number and are secured to the flange 19 at substantially diametrically opposed points and such connections are herein disclosed as obtained through the instrumentality of certain of the bolts 21.

Surrounding the hub H outwardly of the rabbet 17 and substantially concentric with the hub when the wheel is free of load is an annular member M, the mean diameter of said member M being greater than the maximum diameter of the adjacent portion of the hub H whereby said member M and hub H are capable of relative movement one toward the other. At substantially diametrically opposed points, the member M is provided with the outstanding fingers or lugs 26 which are pivotally connected, as at 27, with the arms or bars 25.

The arms or bars 25, together with the annular member M and the members 23, provide an equalizing structure which maintains the wheel structure in desired balance and particularly to maintain the spoke sections 5 and 7 in desired alinement, and at the same time assures an effective driving connection between the hub H and the rim R. It is found in practice of advantage to have the arms or bars 25 substantially in parallelism and this relative relation is maintained at all times by the connection between said arms or bars 25 and the member M.

In the embodiment of our invention as particularly illustrated in Figure 4, substantially the same structure is employed as illustrated in the first embodiment of our invention, except that the outer or free end portions of the arms or bars 25' are operatively engaged with the rim R' through the medium of the links 28. The links 28 are reversely directed and each of said links has one end portion pivotally connected with the outer or free end portion of one of the arms or bars 25' and has its opposite end portion pivotally connected with the rim R' at a point to one side of said associated arm or bar 25'.

From the foregoing description it is thought to be obvious that a resilient wheel constructed in accordance with our invention is particularly well adapted for use by reason of the convenience and facility with which it may be assembled and operated, and it will also be obvious that our invention is susceptible of some change and modification without departing from the principles and spirit thereof and for this reason we do not wish to be understood as limiting ourselves to the precise arrangement and formation of the several parts herein shown in carrying out our invention in practice except as hereinafter claimed.

We claim:

1. A wheel structure comprising, in combination, a hub, a rim, cushioning means interposed between the hub and rim, oppositely directed arms secured to the hub at substantially diametrically opposed points, means for maintaining said arms in parallelism, and means whereby said arms are movably engaged with the rim.

2. A wheel structure comprising, in combination, a hub, a rim, cushioning means interposed between the hub and rim, oppositely directed arms secured to the hub at substantially diametrically opposed points, a member interposed between the intermediate portions of the arms and pivotally connected therewith, and means whereby said arms are movably engaged with the rim.

3. A wheel structure comprising, in combination, a hub, a rim, cushioning means interposed between the hub and rim, oppositely directed arms secured to the hub at substantially diametrically opposed points, a member interposed between the intermediate portions of the arms and pivotally connected therewith, and means whereby said arms are movably engaged with the rim, said member having an intermediate portion surrounding the hub, said hub and surrounding portion of the member having relative movement with respect to the axis of the hub.

4. A wheel structure comprising, in combination, a hub, a rim, cushioning means interposed between the hub and the rim, oppositely directed arms secured to the hub at substantially diametrically opposed points, means for maintaining said arms in parallelism and rigid loops carried by the rim through which the arms are freely disposed.

5. A wheel structure comprising, in combination, a hub, a rim, cushioning means interposed between the hub and the rim, oppositely directed arms secured to the hub at substantially diametrically opposed points, means for maintaining said arms in parallelism, inwardly disposed members carried by the rim at substantially diametrically opposed points, and straps secured to said members to provide loops through which the arms are slidably disposed.

In testimony whereof we hereunto affix our signatures.

WILLIAM ERDWINS.
JOHN C. ERDWINS.